(12) United States Patent
Philbrick et al.

(10) Patent No.: US 11,936,630 B1
(45) Date of Patent: Mar. 19, 2024

(54) SYSTEMS AND METHODS FOR ESTABLISHING ENCRYPTED INTERNET COMMUNICATION

(71) Applicant: United Services Automobile Association (USAA), San Antonio, TX (US)

(72) Inventors: Ashley Raine Philbrick, San Antonio, TX (US); Ryan Thomas Russell, San Antonio, TX (US); David Joaquin Harris, San Antonio, TX (US); Sacha Melquiades De'Angeli, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 296 days.

(21) Appl. No.: 17/243,291

(22) Filed: Apr. 28, 2021

Related U.S. Application Data

(60) Provisional application No. 63/017,502, filed on Apr. 29, 2020.

(51) Int. Cl.
*H04L 9/40* (2022.01)
(52) U.S. Cl.
CPC ........ *H04L 63/0428* (2013.01); *H04L 63/166* (2013.01)

(58) Field of Classification Search
CPC ... H04L 63/0428; H04L 63/166; H04L 67/02; H04L 63/04; H04L 63/18; H04L 63/164; H04L 63/168; H04L 63/205
See application file for complete search history.

(56) References Cited

U.S. PATENT DOCUMENTS

| | | | | |
|---|---|---|---|---|
| 8,751,790 | B2 * | 6/2014 | Harada | H04L 63/0471 713/153 |
| 2003/0103505 | A1 * | 6/2003 | Hidaka | H04L 9/40 370/392 |
| 2009/0327699 | A1 * | 12/2009 | Scott | H04L 63/164 713/153 |
| 2017/0034127 | A1 * | 2/2017 | Singleton, IV | H04L 61/2503 |
| 2017/0339563 | A1 * | 11/2017 | Singleton, IV | H04W 4/80 |
| 2018/0234508 | A1 * | 8/2018 | Tsadok | H04L 67/02 |

FOREIGN PATENT DOCUMENTS

JP  2005063032 A  *  3/2005

* cited by examiner

*Primary Examiner* — Michael R Vaughan
(74) *Attorney, Agent, or Firm* — Fletcher Yoder, P.C.

(57) ABSTRACT

A router includes processing circuitry configured to send a request to a web server to access a website hosted by the web server. Additionally, the processing circuitry is configured identify a pathway between a client device and the web server as well as determine whether the pathway is encrypted or unencrypted. In response to determining that the pathway is unencrypted, the processing circuitry is configured to determine whether an alternative pathway between the client device and the web server via a web host of the web server is available and, in response to determining that the alternative pathway is available, cause the alternative pathway to be established in lieu of the pathway.

20 Claims, 2 Drawing Sheets

SYSTEMS AND METHODS FOR ESTABLISHING ENCRYPTED INTERNET COMMUNICATION

CROSS-REFERENCE TO RELATED APPLICATIONS

Figure 1:
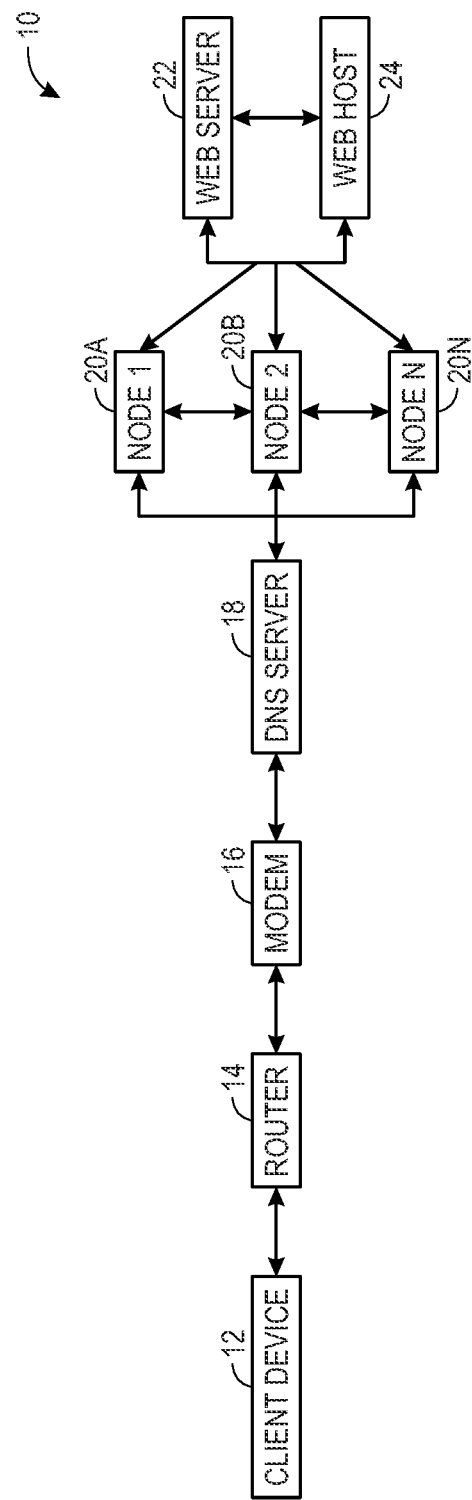

The present disclosure is related to, and claims priority to, U.S. Provisional Patent Application Ser. No. 63/017,502, titled "Systems and Methods for Establishing Encrypted Internet Communication," which was filed on Apr. 29, 2020, and which is herein incorporated by reference in its entirety for all purposes.

BACKGROUND

The field of the disclosure generally relates to communication between devices connected to the Internet, and more specifically, to providing secure (e.g., encrypted) communication pathways.

Connections between multiple devices may be established over the Internet using different types of pathways that utilize various protocols. For example, a computer may access a website using one set of protocols. In some cases, the protocols may be unsecure. For instance, the protocols may not enable data communicated between the computer and a server that hosts the website to be encrypted. When protocols that do not provide for encrypted data to be communicated, digital security issues may be likelier to occur. For example, involved devices may face an increased susceptibility to hacking because the devices may not be able to securely communicate (e.g., via encrypted pathways) with one another, which may thereby render the devices less secure and more susceptible to hacking.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a router includes processing circuitry configured to send a request to a web server to access a website hosted by the web server. Additionally, the processing circuitry is configured identify a pathway between a client device and the web server as well as determine whether the pathway is encrypted or unencrypted. In response to determining that the pathway is unencrypted, the processing circuitry is configured to determine whether an alternative pathway between the client device and the web server via a web host of the web server is available and, in response to determining that the alternative pathway is available, cause the alternative pathway to be established in lieu of the pathway.

In a second embodiment, a non-transitory computer-readable medium includes instructions that, when executed by one or more processors, cause the one or more processors to send a request to a web server to access a web site hosted by the web server, identify a pathway between a client device and the web server, and determine whether the pathway is encrypted or unencrypted. The instructions, when executed, also cause the one or more processors, in response to determining that the pathway is unencrypted, to determine whether an alternative pathway between the client device and the web server via a web host of the web server is available and, in response to determining that the alternative pathway is available, cause the alternative pathway to be established in lieu of the pathway.

In a third embodiment, a computer-implemented method, includes sending, via a router, a request to a web server to access a website hosted by the web server, identifying, via the router, a pathway between a client device and the web server, and determining, via the router, whether the pathway is encrypted or unencrypted. The computer-implemented method also includes, in response to determining that the pathway is unencrypted, determining, via the router, whether an alternative pathway between the client device and the web server via a web host of the web server is available, and, in response to determining that the alternative pathway is available, causing, via the router, the alternative pathway to be established in lieu of the pathway.

DRAWINGS

Figure 2:
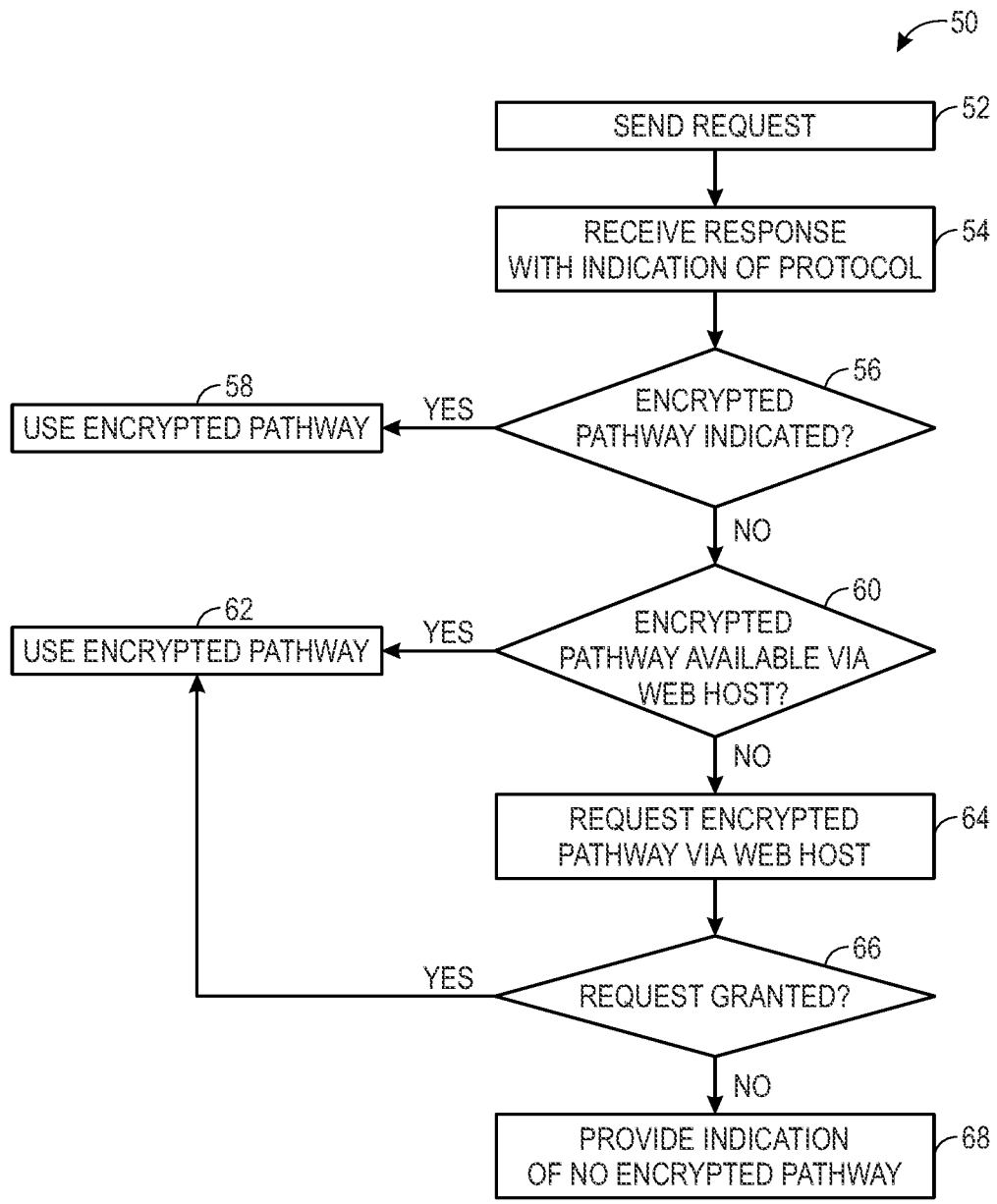

These and other features, aspects, and advantages of the present disclosure will become better understood when the following detailed description is read with reference to the accompanying drawings in which like characters represent like parts throughout the drawings, wherein:

FIG. 1 depicts a block diagram of a communication system, in accordance with aspects of the present disclosure; and FIG. 2 is a flowchart of a process for providing an encrypted communication pathway, in accordance with aspects of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. The terms "optional" or "optionally" mean that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device" and "computing device" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a video camera or other image or motion capture device, a remote motion capture system, and a wearable motion capture system. Furthermore, in the exemplary embodiment, additional output channels may include, but are not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

In general, the present disclosure relates to secure (e.g., encrypted) communication over the Internet. For example, when devices communicate via the Internet, one or more communication and/or security protocols may be utilized. For instance, when a user of a device uses a web browser to access a website, the website and the user's device may communicate with one another using HyperText Transfer Protocol (HTTP), which is unencrypted. In other cases, the user's device may communicate with another website using a secure (e.g., encrypted) protocol, such as HyperText Transfer Protocol Secure (HTTPS). As discussed herein, several techniques may be utilized to enable devices to communicate with one another using encrypted communication pathways over the Internet, thereby providing enhanced online security.

With the preceding context in mind, FIG. 1 is a block diagram of a communication system 10. As illustrated, the communication system 10 includes a client device 12, a modem 16, a router 14, a Domain Name System (DNS) server 18, nodes 20A, 20B, 20N, a web server 22, and a web host 24. While discussed in more detail below, the client device 12 and web server 22 may exchange data with one another via the other components included in the communication system 10. For example, the client device 12 may be a computer (or another type of electronic device) that is attempting to access a website that is hosted on the web server 22. Thus, FIG. 1 is illustrative of communication using the Internet.

The client device 12 may be any suitable computing device, such as a general or special-purpose personal computer, a laptop computer, a tablet computer, a mobile computer, a server, smart devices (e.g., speakers, televisions, wearables devices, appliances, or other Internet of things (IoT) devices), and the like that is configured in accordance with present embodiments. The client device 12 may include various types of components that may assist the client device 12 in performing various types of computer tasks and operations. For example, the client device 12 may include a processor, one or more databases, and a communication device. In addition, the client device 12 may include memory, one or more storage devices, a display, input/output (I/O) ports, and the like. For example, the client device 12 may have include software (e.g., computer-readable instructions) that a processor of the client device 12 may execute in order to access the Internet, such as a web browser. Furthermore, while only a single client device 12 is illustrated, the communication system may include several client devices 12.

The client device 12 is communicatively coupled to the router 14, which may provide a network (e.g., local area network (LAN)) that the client device 12 is connected to. The connection between the client device 12 may be a wired or wireless connection. Additionally, the router 14 may assign an Internet Protocol (IP) address to the client device 12 and any other devices connected to the network provided by the router 14. The router 14 is communicatively coupled to the modem 16, and the modem 16 provides an Internet connection. More specifically, the modem 16 may communicate with devices of other networks (e.g., nodes 20A, 20B, 20N) and translate communication signals between router 14 and other devices connected to the Internet, such as the DNS server 18, the nodes 20A, 20B, 20N, and the web server 22. Thus, the modem 16 may provide Internet access to the network provided by the router 14, thereby enabling the client device 12 to access the Internet. In some embodiments, the router 14 and modem 16 may be combined within a single electronic device, whereas in other embodiments, the router 14 and modem 16 may be separate devices.

When the client device 12 utilizes the Internet, the client device 12 may request access to other devices connected to the Internet. For example, a user of input into a web browser of the client device 12 a Uniform Resource Locator (URL), or web address, that specifies a web resource, such as website. The DNS server 18 may receive the web address (e.g., via the router 14 and modem 16) and find an IP address corresponding to the web address. For example, the DNS server 18 may interact with the nodes 20A, 20B, 20N, which may include other servers connected to the Internet (such as other DNS servers), to determine an IP address for a requested web address, and the DNS server 18 may provide the IP address to the client device 12.

The web server 22 is a server that may be connected to the Internet and accessed by the client device 12. For example, the web server 22 may host a web site that has a URL that the client device 12 accesses. The web server 22 has an IP address. Thus, to access the website hosted by the web server 22, the DNS server 18 may determine the IP address of the web server 22 and provide the IP address of the web server 22 to the modem 16, router 14, and client device 12. Additionally, the DNS server 18 may provide the IP address of the client device 12 to the web server 22.

The web host 24 may be one or more servers that host one or more websites. The web server 22 may be included in the servers of the web host 24. The web host 24 may access the web server 22 using a pathway associated with a web address that may not be as well-known as a web address associated with website hosted on the web server 22. For example, the web server 22 may host a website with a URL of "www.websitename.com." However, the web host 24 may also provide a second URL that provides the same content as the web site. For instance, there may be a URL of "www.webhost.com/websitename" that provides the content of the website. However, this second URL may be associated with another IP address, may be accessed via a different pathway than the web server 22, or both. In some cases, this pathway to the web server 22 from the web host 24 may encrypted while other pathways (e.g., via the nodes 20A, 20B, 20N but not via the web host 24) to the web server 22 are unencrypted. As discussed below, in some cases, it may be possible to establish an encrypted connection to the web server 22 via the web host 24 in cases when an encrypted connection to the web server 22 is otherwise unavailable (e.g., without using a connection that the web host 24 has established with the web server 22).

Data may be exchanged between devices connected to the Internet using several different protocols, such as HTTP and HTTPS. For example, when the client device 12 attempts to access the web site hosted by the web server 22, a request that specifies the URL of the web site and a protocol (e.g., a particular version of HTTP or HTTPS) may be generated and ultimately provided to the web server 22 (e.g., via one or more of the nodes 20A, 20B, 20N). The web server 22 may respond to the request to establish a connection to the client device 12. In other words, the client device 12 and web server 22 may preliminarily exchange information with each other to enable the client device 12 to access a website hosted by the web server 22.

However, the data being communicated between the client device 12 and the web server 22 is provided to the nodes 20A, 20B, 20N (e.g., other devices connected to the Internet such as servers). For example, data from the client device 12 may follow one pathway utilizing one or more of the nodes 20A, 20B, 20N, while data from the web server 22 may follow a different pathway that utilized a different combination of the nodes 20A, 20B, 20N. Thus, when using an unsecured protocol, such as HTTP, data exchanged between the client device 12 and the web server 22 may also be accessed by the nodes 20A, 20B, 20N as well as other devices communicatively coupled to the nodes 20A, 20B, 20N (e.g., via an Internet connection). Secure protocols, such as HTTPS, enable data to be exchanged between the client device 12 and the web server 22 in a secure manner by utilizing cryptographic protocols such as Transport Layer Security (TLS) or Secure Sockets Layer (SSL). For example, in the HTTPS protocol, the client device 12 and web server 22 may initially negotiate which encryption algorithm and cryptographic keys will be utilized when communicating with one another. Once determined, encrypted data may be exchanged between the client device 12 and the web server 22, and the client device 12 and web server 22 may decrypt the data using the cryptographic keys.

Cryptographic keys may be public or private. A public key is a key that is publicly made available, while a private key is a key that is generated by a device and typically only shared with another device that is the intended recipient of data from the originating device. For example, data may be encrypted using a party's (e.g., web server 22, client device 12) public key. The device receiving the data may decrypt the received data using a private key of the device that provided the information.

Accordingly, when the client device 12 and web server 22 are to communicate with one another (e.g., to provide data of for a web site to the client device 12), the client device 12 and web server 22 may determine how data will be communicated (e.g., which protocol will be used, what type of encryption will be used (if applicable)).

Using unsecure (e.g., unencrypted) protocols can make the client device 12 more susceptible to security threats, such as hacking. Accordingly, when possible, it may be preferable to utilize encrypted pathways to reduce and/or eliminate potential security threats that are associated with using unencrypted protocols. In other words, by using encrypted protocols, data exchanged along a pathway between the client device 12 and the web server 22 may only be decrypted by the client device 12 and the web server 22.

However, in some cases, a web site may not be accessible using an encrypted protocol. For instance, if a party that created the web site has not requested and/or paid for TLS or SSL, an encrypted connection to the portion of the web server 22 associated with the website may not be possible using typical techniques. In some cases, an encrypted connection may be not be available because the client device 12 and web server 22 do not share any mutual encryption techniques. Accordingly, even if it is possible to have encrypted communications with each device in the communication system 10 other than the web server 22, an ultimately unencrypted pathway may be utilized because the web server 22 is unable to establish an encrypted connection. As discussed below with respect to FIG. 2, the router 14 may be utilized to establish a secure connection (e.g., encrypted connection), especially in cases in which it appears that an unencrypted pathway would be used to enable communication between the client device 12 and the web server 22.

Keeping the foregoing discussion of FIG. 1 in mind, FIG. 2 is a flow diagram of a process 50 for establishing an encrypted communication pathway between the client device 12 and the web server 22. The process 50 may be performed by processing circuitry included in the router 14 that executes computer-readable instructions that may be stored on memory or a storage device of the router 14. Alternatively, the process 50 may be performed by the modem 16 by processing circuitry included in the modem 16 that executes computer-readable instructions that may be stored on memory or a storage device of the modem 16 alone or in combination with the router 14. Thus, while the discussion provided below provides that the operations of the process 50 are performed by the router 14, in some embodiments, these operations may be performed by the modem 16 or in combination with the modem 16.

At process block 52, the router 14 may send a request to access a web address, such as a URL for a website that is hosted by the web server 22. The request may be generated in response to another request from the client device 12 to the router 14 to access the website. As discussed above, the request may include the URL as well as other information, such as protocols and/or types of encryption that the client device 12 may be capable of using. The request may ultimately be delivered to the web server 22, for example, after an IP address corresponding to the URL is determined (e.g., via the DNS server 18).

At process block 54, the router 14 may receive a response from the web server 22. The response may indicate the protocols and/or encryption techniques that the web server 22 can use to establish a connection to the client device 12 via the router 14. In other words, the response be indicative of whether the web server 22 is able to provide access to the website via an encrypted pathway (e.g., using HTTPS) using an encryption technique supported by the client device. At decision block 56, the router 14 determines whether an encrypted pathway between the client device 12 to the web site hosted by the web server 22 is available. For instance, when the web server 22 is able to provide access to the website via an encrypted pathway (e.g., using HTTPS) using an encryption technique supported by the client device, the router 14 may determine that an encrypted pathway is available. When an encrypted pathway is available, at process block 58, a connection between the client device 12 and the web server 22 may be established using the encrypted pathway (e.g., using HTTPS). Furthermore, it should be noted that, at decision block 56, the router 14 may not consider pathways between the client device 12 to the web site hosted by the web server 22 that include the web host 24. In other words, at decision block 56, the router 14 may determine when an encrypted pathway that does not include the web host 24 is available.

However, if at decision block 56 the router 14 determines that an encrypted pathway is not available, at decision block 60, the router 14 may determine whether there is an encrypted pathway available via the web host 24. For example, the router 14 may determine that the response from the web server 22 is not indicative of an encrypted pathway being available when the protocol is indicative of the web server 22 using an unencrypted protocol (e.g., HTTP) or when the client device 12 and the web server 22 are unable to use the same encryption technique (e.g., encryption algorithm). In such cases, the router 14 may determine whether there is an encrypted pathway available via the web host 24. For instance, the router 14 may request the DNS server 18 to determine whether another URL for the web site exists (e.g., a URL associated with the web host 24). When another URL is available, it may be possible to access the website using a connection (i.e., pathway) from the client device 12 to the web host 24 to the web server 22 in which the connection utilizes an encrypted pathway. In other words, while an encrypted pathway to the website from the client device 12 may not have been available, the web host 24 may have a secure connection (e.g., encrypted connection) to the portion of the web server 22 that hosts the website. When such a pathway is available, at process block 62, an encrypted pathway between the client device 12 and the web server 22 that utilizes the secure pathway between the web host 24 and the web server 22 may be utilized (e.g., in lieu of using an unencrypted pathway).

However, if at decision block 60 the router 14 determines than an encrypted pathway via the web host 24 is not available, at process block 64, the router 14 may request that the web host 24 provide an encrypted pathway to the web server 22. Such a request may be aided by the DNS server 18 in a manner generally similar to the technique described above with respect to decision block 60. Additionally, in some cases, the request may indicate that an entity associated with the router 14 (e.g., a user of the client device 12 or an internet service provider (ISP) of the user of the client device 12) is willing to pay for encrypted access to the web server 22.

At decision block 66, the router 14 may determine whether the request associated with process block 64 is granted. For example, the router 14 may receive a response from the web host 24 indicating that the web host 24 is granting permission to the client device 12 to access the web server 22 via the web host 24 using an encrypted protocol (e.g., HTTPS). In such a case, the router 14 may determine that the request was granted and, at process block 62, utilize encrypted pathway between the client device 12 and the web server 22 via a secure pathway between the web host 24 and the web server 22.

If at decision block 66 the router determines that the request was denied, at process block 68, the router 14 may provide an indication to the client device 12 that an encrypted pathway between the client device 12 and the web server 22 cannot be established. The indication may be provided, for example, on a display of the client device 12. In some embodiments, the provided indication may also request a user input regarding whether the user of the client device 12 would like to access the website hosted by the web server 22 using an unencrypted pathway. When the user requests that access to provided, an unencrypted pathway between the client device 12 and the web server 22 may be established.

Accordingly, the techniques discussed herein enable secure connections (e.g., using HTTPS) between client devices and websites that may otherwise appear to be accessible only using unencrypted pathways. For example, in some cases, such as when multiple URLs may be utilized to access the same content, it may be possible to establish an encrypted connection between the client device 12 and the web server 22 utilizing a secure pathway between the web host 24 and the web server 22. By enabling access via secure (e.g., encrypted) pathways, the susceptibility of computing devices to security incidents, such as hacking, is reduced and/or eliminated.

Each device depicted in FIG. 1 (e.g., client device 12, router 14, modem 16, DNS server 18, nodes 20A, 20B, 20N, web server 22, and web host 24) may include processing circuitry, memory, storage devices, input/output (I/O) ports, and communication circuitry. The processing circuitry may execute computer-readable instructions stored on the memory and/or storage devices. Furthermore, client device 12, router 14, modem 16, DNS server 18, nodes 20A, 20B, 20N, web server 22, and web host 24 may be communicatively coupled to one another via the I/O ports and/or communication circuitry.

Exemplary embodiments discussed herein are not limited to the specific embodiments described herein, but rather, components of systems and/or steps of the methods may be utilized independently and separately from other components and/or steps described herein. For example, the methods, systems, and apparatus may also be used in combination with other systems and are not limited to practice with only the systems and methods as described herein. Rather, the exemplary embodiment can be implemented and utilized in connection with many other applications, equipment, and systems that may benefit from utilizing encrypted communication pathways.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A router comprising processing circuitry configured to:
   send a request to a web server to access a website hosted by the web server;
   identify a pathway between a client device and the web server;
   determine whether the pathway is encrypted or unencrypted; and
   in response to determining that the pathway is unencrypted:
      determine whether an alternative pathway between the client device and the web server via a web host of the web server is available;
      in response to determining that the alternative pathway is available, cause the alternative pathway to be established in lieu of the pathway; and
      in response to determining the alternative pathway is unavailable:
         request another pathway between the client device and the web server be established;
         receive a response indicating whether the request to establish the other pathway is granted; and
         in response to the response indicating the request to establish the other pathway is not granted:
            cause an indication to be provided to the client device indicating that no encrypted pathway between the client device and the web server can be established;
            after causing the indication to be provided to the client device, receive a second indication from the client device indicative of a request to access the website hosted by the web server using an unencrypted pathway; and
            in response to receiving the second indication, cause the unencrypted pathway between the client device and the web server to be established.

2. The router of claim 1, wherein the alternative pathway between the client device and the web server via the web host is an encrypted pathway.

3. The router of claim 2, wherein the encrypted pathway utilizes HyperText Transfer Protocol Secure (HTTPS).

4. The router of claim 2, wherein the processing circuitry is configured to determine whether the pathway is encrypted or unencrypted, by receiving a response from the web server after sending the request to access the website, the response indicating that the pathway is encrypted or unencrypted.

5. The router of claim 4, wherein:
   the request comprises a first web address for the website; and
   the processing circuitry is configured to determine whether the alternative pathway is available based on a determination of whether there is an alternative web address for the website.

6. The router of claim 5, wherein the processing circuitry is configured to:
   request access to the website hosted by the web server via the alternative pathway;
   receive a second response indicating whether access to the website via the alternative pathway is granted; and
   cause the alternative pathway to be established in response to the second response indicating access to the website via the alternative pathway is granted.

7. The router of claim 1, wherein the pathway between the client device and the web server is not via the web host.

8. A non-transitory computer-readable medium comprising instructions that, when executed by one or more processors of a router, cause the one or more processors to:
   send a request to a web server to access a website hosted by the web server;
   identify a pathway between a client device and the web server;
   determine whether the pathway is encrypted or unencrypted; and
   in response to determining that the pathway is unencrypted:
      determine whether an alternative pathway between the client device and the web server via a web host of the web server is available;
      in response to determining that the alternative pathway is available, cause the alternative pathway to be established in lieu of the pathway; and
      in response to determining the alternative pathway is unavailable:
         request another pathway between the client device and the web server be established;
         receive a response indicating whether the request to establish the other pathway is granted; and
         in response to the response indicating the request to establish the other pathway is not granted:
            cause an indication to be provided to the client device indicating that no encrypted pathway between the client device and the web server can be established;
            after causing the indication to be provided to the client device, receive a second indication from the client device indicative of a request to access the website hosted by the web server using an unencrypted pathway; and
            in response to receiving the second indication, cause the unencrypted pathway between the client device and the web server to be established.

9. The non-transitory computer-readable medium of claim 8, wherein the instructions, when executed, cause the one or more processors to:
   after sending the request to access the website, receive a response from the web server indicating that the pathway is encrypted or unencrypted; and
   determine whether the alternative pathway is available in response to the response indicating that the pathway is unencrypted.

10. The non-transitory computer-readable medium of claim 8, wherein the alternative pathway between the client device and the web server via the web host is an encrypted pathway.

11. The non-transitory computer-readable medium of claim 10, wherein:
the request comprises a first web address for the web site; and
the instructions, when executed, cause the one or more processors to determine whether the alternative pathway is available based on determining there is an alternative web address for the web site.

12. The non-transitory computer-readable medium of claim 10, wherein the instructions, when executed, cause the one or more processors to:
cause the other pathway to be established in response to the response indicating the request to establish the other pathway is granted.

13. The non-transitory computer-readable medium of claim 8, wherein pathway between the client device and the web server is not via the web host.

14. The non-transitory computer-readable medium of claim 8, wherein the instructions, when executed, are configured to cause the one or more processors to:
in response to determining the pathway is encrypted, cause the pathway between the client device and the web server to be established.

15. A computer-implemented method, comprising:
sending, via a router, a request to a web server to access a website hosted by the web server;
identifying, via the router, a pathway between a client device and the web server;
determining, via the router, whether the pathway is encrypted or unencrypted; and
in response to determining that the pathway is unencrypted:
determining, via the router, whether an alternative pathway between the client device and the web server via a web host of the web server is available;
in response to determining that the alternative pathway is available, causing, via the router, the alternative pathway to be established in lieu of the pathway; and
in response to determining the alternative pathway is unavailable:
requesting, via the router, another pathway between the client device and the web server be established;
receiving, via the router, a response indicating whether the request to establish the other pathway is granted; and
in response to the response indicating the request to establish the other pathway is not granted:
causing, via the router, an indication to be provided to the client device indicating that no encrypted pathway between the client device and the web server can be established;
after causing the indication to be provided to the client device, receiving, via the router, a second indication from the client device indicative of a request to access the website hosted by the web server using an unencrypted pathway; and
in response to receiving the second indication, causing, via the router, the unencrypted pathway between the client device and the web server to be established.

16. The computer-implemented method of claim 15, comprising:
after sending the request to access the website, receiving, via the router, a response from the web server indicating that the pathway is encrypted or unencrypted; and
determining, via the router, whether the pathway is encrypted or unencrypted based on the response.

17. The computer-implemented method of claim 16, comprising causing, via the router, the alternative pathway to be established based on determining whether the alternative pathway is available.

18. The computer-implemented method of claim 17, wherein:
the request comprises a first web address for the website; and
the computer-implemented method comprises determining, via the router, whether the pathway between the client device and the web server via the web host is available based on a determination of whether there is an alternative web address for the website.

19. The computer-implemented method of claim 18, wherein the alternative pathway is encrypted and utilizes an Internet Protocol (IP) address associated with the alternative web address.

20. The computer-implemented method of claim 19, wherein the alternative pathway utilizes Hypertext Transfer Protocol Secure (HTTPS).

* * * * *